W. F. ADKISON.
COMBINED CULTIVATOR AND COTTON CHOPPER.
APPLICATION FILED FEB. 6, 1913.

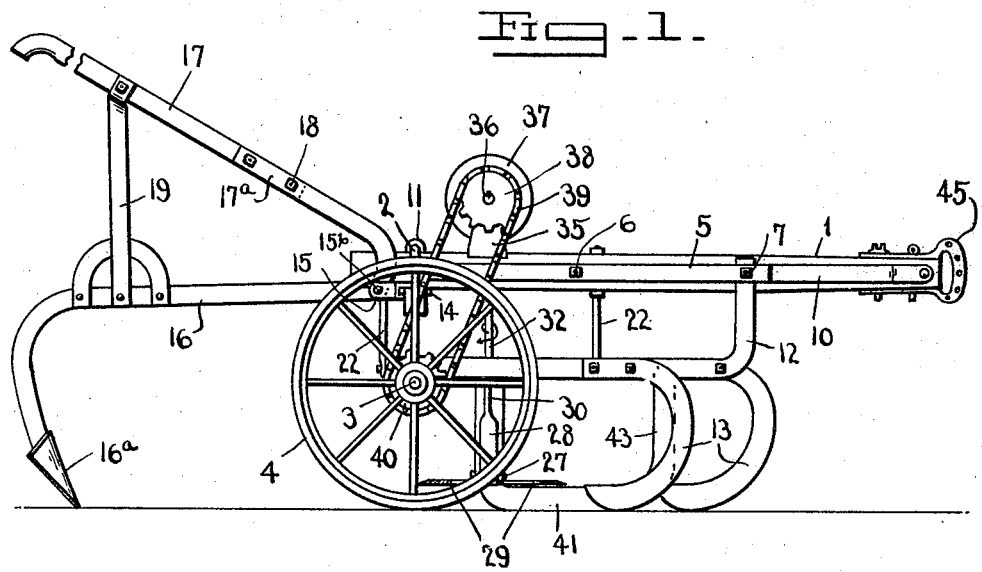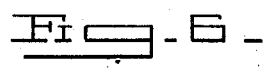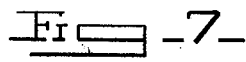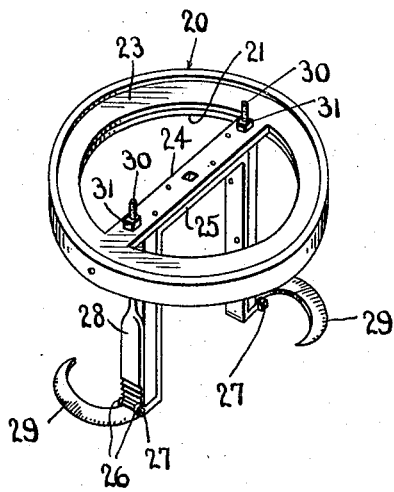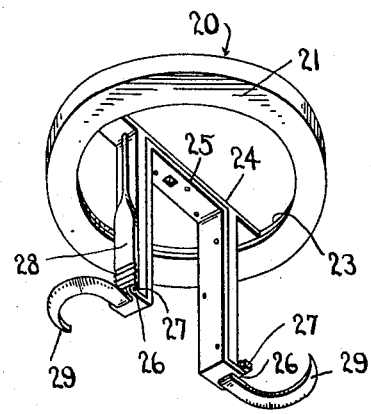

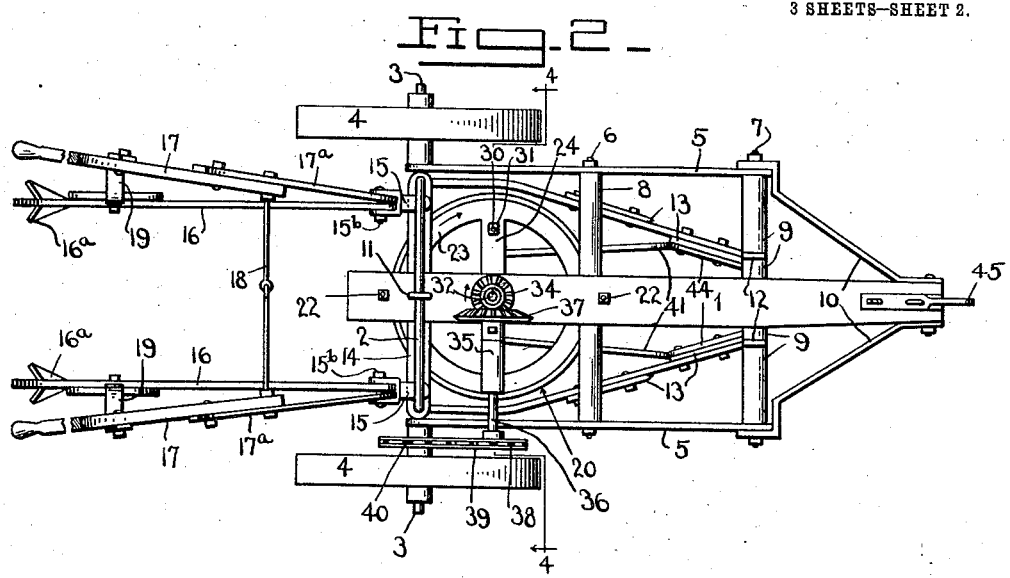
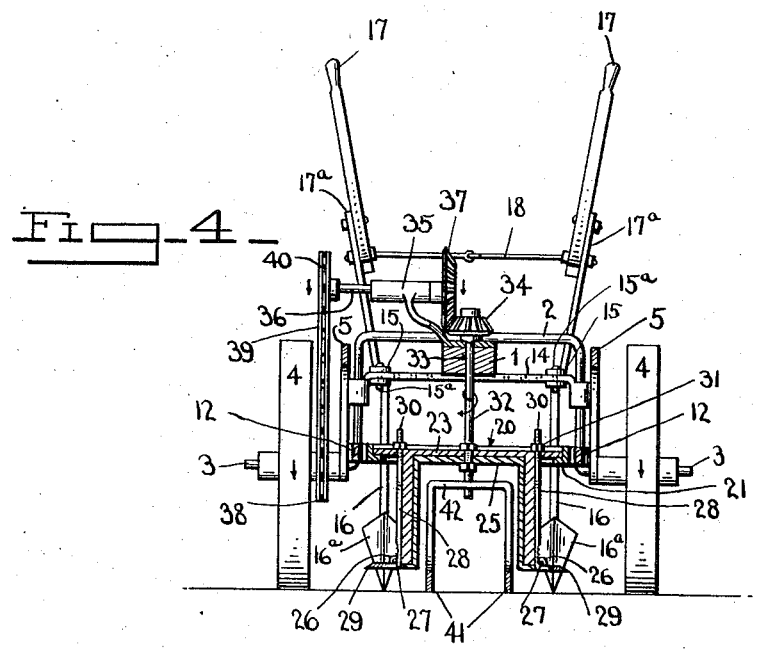

1,066,172.

Patented July 1, 1913.

3 SHEETS—SHEET 3.

Witnesses
L. B. James
C. E. Hunt

Inventor
William F. Adkison

By H. B. Wilson & Co.
Attorneys

UNITED STATES PATENT OFFICE.

WILLIAM F. ADKISON, OF MOUNT VERNON, ARKANSAS.

COMBINED CULTIVATOR AND COTTON-CHOPPER.

1,066,172. Specification of Letters Patent. Patented July 1, 1913.

Application filed February 6, 1913. Serial No. 746,602.

*To all whom it may concern:*

Be it known that I, WILLIAM F. ADKISON, a citizen of the United States, residing at Mount Vernon, in the county of Faulkner and State of Arkansas, have invented certain new and useful Improvements in Combined Cultivators and Cotton-Choppers; and I do declare the following to be a full, clear, and exact description of the invention, such as will enable others skilled in the art to which it appertains to make and use the same.

This invention relates to improvements in combined cultivators and cotton choppers.

One object of the invention is to provide a cultivator having an improved construction and arrangement of revolubly mounted chopping hoes, whereby the rows of cotton or other plants may be thinned out simultaneously with the cultivation thereof.

Another object is to provide a machine of this character which will be simple, strong and durable in construction, efficient and reliable in operation and well adapted to the purpose for which it is designed.

With these and other objects in view, the invention consists of certain novel features, and the combination and arrangement of parts as will be more fully described and claimed.

Figure 3:
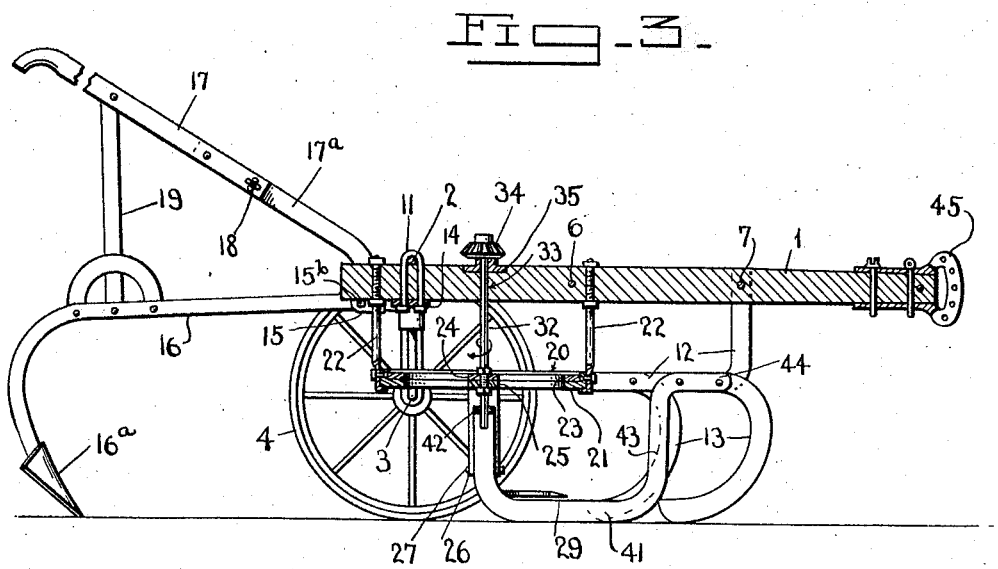
Figure 5:
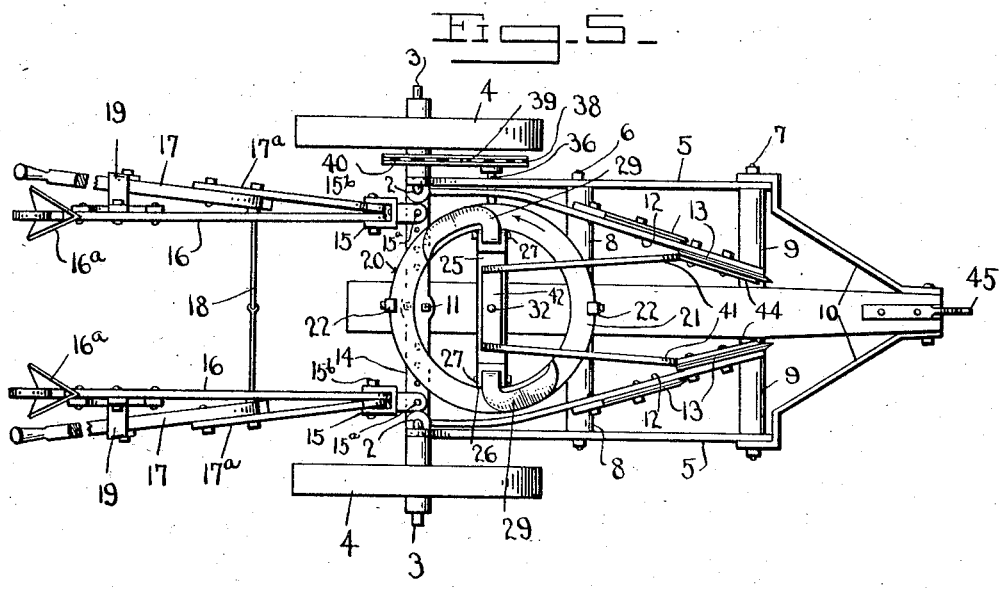

In the accompanying drawings; Figure 1 is a side view of my improved cultivator and cotton chopper; Fig. 2 is a top plan view thereof; Fig. 3 is a central longitudinal section; Fig. 4 is a vertical cross section taken on the line 4—4 of Fig. 2; Fig. 5 is a bottom plan view; Fig. 6 is a top perspective view of the chopping hoe supporting and operating mechanism; Fig. 7 is a bottom perspective view of the same.

My improved cultivator and cotton chopper comprises a main beam 1 to the upper side of which near its rear end is secured an arched axle 2 on the spindles 3 of which are revolubly mounted supporting wheels 4. Secured to the beam 1 is a frame comprising side bars 5 which are connected to and spaced from the opposite sides of the beam by transversely disposed rods or bolts 6 and 7. On the rod 6 are arranged spacing sleeves 8 while on the rod 7 are arranged pairs of spacing sleeves 9. The sleeves 8 and 9 space the side bars of the frame at the proper distances from the opposite sides of the beam 1 while the rods 6 and 7 firmly secure said bars to the beam. The rear ends of the bars 5 project downwardly at right angles and are engaged with the inner portions of the spindles 3 of the axle. The forward ends of the bars 5 are connected to the forward end of the main beam 1 by inwardly extending diagonally arranged brace bars 10. The upper cross bar of the axle 2 is preferably secured to the upper side of the rear end of the beam 1 by a U-bolt 11 arranged through the beam as shown.

Connected at their forward ends to the rods or bolts 7 which secure the forward ends of the side bars 5 to the tongue are the right angular upwardly projecting forward ends of blade supporting beams 12. The beams 12 converge slightly toward their forward ends and have their rear ends engaged with the inner ends of the axle spindles between the side portions of the arch and the rear downwardly turned ends of the side bars 5 as shown. Secured to opposite sides of the forward portion of the beams 12 are pairs of curved scraping and weed cutting blades 13 one of which in each pair is arranged slightly in advance of the other on each of the beams 12 as shown.

Secured to the lower side of the beam 1 near its rear end preferably by the bolt 11, which fastens the axle 2 or in any other suitable manner, is a cross bar 14 which projects laterally beyond each side of the beam and has its ends turned downwardly and cupped or bent around the vertical portions of the arched axle 2 as shown. In the cross bar 14 are formed series of bolt holes to which are adjustably secured double clips 15 by means of which the cultivator beams 16 and handles 17 are adjustably attached to the rear end of the machine. The forward portions of the clips 15 are adjustably secured in the bolt holes of the cross bar 14 by bolts 15ᵃ which are dropped through alined apertures in the clips and through the bolt holes in the bar and may be readily removed to permit the clips to be slipped along inwardly or outwardly on the ends of the bar as will be readily understood. The forward ends of the plow beams 16 and the downwardly turned forward ends of the handles 17 are pivotally connected to the rear portions of the double clips 15 by bolts 15$^b$ whereby when the clips are adjusted on the cross bar 14 the forward ends of the handles and of the plow beams will be brought nearer to or farther from the beam, or in other words, these parts may be spread apart to a greater or less extent by the adjustment of the clips 15 on the cross bar 14. The forward ends of the handles 17 are preferably in the form of flat metal bars 17$^a$ which are bolted at their rear ends to the handles and at their forward ends are attached to the clips 15 by the bolts 15$^b$ as hereinbefore described. The handles 17 are connected at points adjacent to the forward ends of the main or wooden portions thereof by a jointed cross bar 18, and said handles are connected intermediate their ends to the plow beams 14 by vertically disposed brace bars 19 as shown. The rear ends of the beams 16 are turned downwardly to form standards to the lower ends of which are secured cultivator plows or shovels 16$^a$ whereby the cotton or other plants are cultivated simultaneously with the weeding and chopping or thinning out of the same by the chopping mechanism of the machine hereinafter described.

Arranged at a suitable distance below the rear end of the main beam 1 and in the arched portion of the axle is a chopping hoe mechanism comprising a horizontally disposed circular wheel supporting frame or bracket 20 having on its outer edge an annular wheel retaining flange 21. The frame or bracket 20 is supported and held in position below the beam 1 by hanger bolts 22, the lower ends of which are flattened and suitably secured to the frame 20 while their upper ends are inserted through bolt holes in the beam 1 and are secured by nuts or other suitable fastening devices. Revolubly supported in the bracket or frame 20 is a hoe supporting and operating wheel 23 having a transversely disposed hoe attaching web 24 to the under side of which is secured a hoe attaching strap 25 having right angular offset ends on which are formed pairs of spaced apertured lugs 26. Arranged between and having their ends engaged with the lugs 26 are hoe retaining bolts 27 between which and the lugs 26 are engaged the right angular corrugated shanks 28 of laterally projecting curved chopping hoes 29. The shanks 28 of the hoes have screw threaded bolts 30 which project upwardly through the bolt holes in the web 24 and have engaged with their upper ends nuts 31, whereby the hoes are detachably and adjustably secured to the web 24 of the wheel. The blades are rigidly secured in their adjusted positions by the engagement of the bolts 27 with the corrugations in the shanks 28 as shown.

The hoe supporting wheel 23 is fixedly mounted on the lower end of the operating shaft 32 which projects upwardly through and is revolubly mounted in a bearing aperture 33 in the rear portion of the main beam 1 and has fixed on its upper end a beveled gear 34. Revolubly mounted in a bearing bracket 25 suitably secured to the beam and frame of the machine is a drive shaft 36 having on its inner end a beveled gear 37 which is engaged with the beveled gear 34 on the upper end of the wheel operating shaft 32. On the outer end of the drive shaft 36 is fixed a sprocket gear 38 which is connected by a sprocket chain 39 with a sprocket gear 40 arranged on the inner end of the hub of the adjacent supporting wheel 4 as shown. By thus constructing and arranging the chopping hoe supporting and operating mechanism and connecting the latter with one of the supporting wheels in the manner described, it will be seen that the chopping hoes will be revolved at the proper speed when the machine is drawn along the rows of plants, which causes the hoes to chop out the cotton or other plants at intervals along the rows, thus thinning the latter simultaneously with the weeding and cultivating operations which are performed by the blades 13 and cultivating plows 15 hereinbefore described.

Arranged beneath the forward end of the machine are runners 41, said runners being preferably formed from a single iron rod bent midway between its ends to form a loop 42, said looped end being bent upwardly at right angles to form an arch at the inner end of the ground engaging portions of the runners, while the outer ends of the rod are bent upwardly at right angles to form the front standards 43 of the runners, said standards having their upper ends flattened and bent forwardly to form attaching lugs 44 which are bolted to the inner sides of the beams 12 to which the scraping and weeding blades 13 are secured, said lugs being preferably fastened to the beams by the same bolts which fasten the front scraping and weeding blades 13 as shown. The upper end of the arched rear ends of the runners forms a support for the lower end of the shaft 32 to which the revolving hoe supporting and operating wheel 23 is attached and operated, said arched rear end of the runners having therein a bearing aperture to receive the lower end of the shaft 32 as shown.

On the forward end of the main beam 1 is secured a clevis 45 which may be of any suitable construction and through which the draft animals may be hitched to the machine.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. A combined cultivator and cotton chopper comprising a main beam, an axle connected therewith, supporting wheels mounted on said axle, a frame connected with said beam and with said axle, blade supporting beams connected at their forward ends with said frame and engaged with said axle, scraping blades secured to said beams, hoe attaching beams connected with said main beam, cultivating hoes carried by said beams, a chopping hoe supporting frame carried by the machine, a hoe operating wheel revolubly mounted in said frame, chopping hoes carried by said wheel, a hoe operating shaft, a revolubly mounted drive shaft geared to said hoe operating shaft and having an operative connection with one of the supporting wheels of the machine, whereby the movement of said wheel is imparted to the hoe supporting and operating wheel.

2. A combined cultivator and cotton chopper comprising a main beam, an arched axle connected thereto, supporting wheels revolubly mounted on the spindles of said axle, a frame comprising side bars secured to and spaced from the opposite side of said beam and having right angular rear ends engaged with the spindles of said axle, blade supporting beams connected at their forward ends with said frame and having their rear ends engaged with the spindles of the axle, scraping blades secured to the forward ends of said beams, plow beams connected at their forward ends to the machine, cultivating hoes carried by said beams, a circular chopping hoe frame secured to and arranged beneath said main beam, a chopping hoe operating wheel revolubly mounted in said frame, chopping hoes carried by said wheel, a wheel operating shaft revolubly mounted in said main beam and having its lower end fixed to said wheel, a drive shaft geared to the upper end of said operating shaft and to one of said supporting wheels, and handles suitably connected with the frame and plow beams of the machine.

3. In a combined cultivator and cotton chopper, a main beam, scraping blades and cultivating hoes carried by the machine, an axle connected to said main beam, supporting wheels revolubly mounted on said axle, a circular chopping hoe supporting frame secured to said main beam, a chopping hoe supporting and operating wheel revolubly mounted in said frame, curved chopping blades detachably connected with said wheel, an operating shaft revolubly mounted in said main beam and having its lower end fixedly mounted in said wheel, a suitably mounted drive shaft geared to the upper end of said wheel operating shaft and to one of said supporting wheels, whereby the movement of the latter is imparted to the chopping hoe wheel to revolve said chopping hoes.

4. A combined cultivator and cotton chopper comprising a main beam, an axle connected thereto, supporting wheels mounted on said axle, a frame connected with said beam and with said axle, blade supporting beams connected at their forward ends to said frame and at their rear ends to the axle, scraping blades secured to said beams, runners connected at their forward ends to said blade supporting beams and having their rear ends terminating in an upwardly projecting arch, hoe attaching beams connected with said main beam, cultivating hoes carried by said beams, a chopping hoe supporting frame secured to said beam, a hoe operating wheel revolubly mounted in said frame, chopping hoes carried by said wheel, a hoe operating shaft revolubly mounted in said main beam and in the upper end of the arch of said runners, and means whereby said shaft is geared to and driven by one of the supporting wheels of the machine.

5. A combined cultivator and cotton chopper comprising a main beam, an axle connected therewith, supporting wheels mounted on said axle, cultivator beams connected with said main beam, cultivator shovels carried by said cultivator beams a chopping hoe supporting frame secured to said main beam, a hoe operating wheel revolubly mounted in said frame, a transverse hoe attaching web carried by said wheel, a hoe attaching member secured to said web, said member having depending ends provided on their lower extremities with offset lugs, curved attaching hoes adjustably secured to said lugs and having on their inner ends upwardly extending corrugated shanks provided with reduced threaded upper ends adapted to engage the web of said hoe operating wheel, nuts arranged on said threaded ends of the shanks whereby said hoes are adjustably and detachably secured to the hoe operating wheel, bolts engaged with the lugs on said hoe attaching member and with the corrugations on the shanks of the hoes whereby the latter are rigidly secured in their adjusted positions and a hoe operating shaft revolubly mounted in said main beam, and secured at its lower end to said hoe operating wheel, and means whereby said shaft is geared to and driven by one of the supporting wheels of the machine.

In testimony whereof I have hereunto set my hand in presence of two subscribing witnesses.

WILLIAM F. ADKISON.

Witnesses:
W. A. KEATHLEY,
E. E. JONES.

Copies of this patent may be obtained for five cents each, by addressing the "Commissioner of Patents, Washington, D. C."